US010616829B2

United States Patent
Kim et al.

(10) Patent No.: US 10,616,829 B2
(45) Date of Patent: Apr. 7, 2020

(54) METHOD FOR SELECTING PLMN OF TERMINAL IN WIRELESS COMMUNICATION SYSTEM AND APPARATUS FOR SAME

(71) Applicant: LG ELECTRONICS INC., Seoul (KR)

(72) Inventors: Taehun Kim, Seoul (KR); Jaehyun Kim, Seoul (KR); Jinsook Ryu, Seoul (KR); Hyunsook Kim, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/545,464

(22) PCT Filed: Feb. 2, 2016

(86) PCT No.: PCT/KR2016/001154
§ 371 (c)(1),
(2) Date: Jul. 21, 2017

(87) PCT Pub. No.: WO2016/126092
PCT Pub. Date: Aug. 11, 2016

(65) Prior Publication Data
US 2018/0007621 A1    Jan. 4, 2018

Related U.S. Application Data

(60) Provisional application No. 62/111,055, filed on Feb. 2, 2015, provisional application No. 62/130,628, filed
(Continued)

(51) Int. Cl.
*H04W 48/18* (2009.01)
*H04W 48/02* (2009.01)
(Continued)

(52) U.S. Cl.
CPC ........... *H04W 48/18* (2013.01); *H04W 48/02* (2013.01); *H04W 60/00* (2013.01);
(Continued)

(58) Field of Classification Search
None
See application file for complete search history.

(56) References Cited

U.S. PATENT DOCUMENTS 9,380,549 B2 *  6/2016  Kiss .................... H04L 65/1006
9,686,635 B2 *  6/2017  Watfa ................... H04W 76/14
(Continued)

FOREIGN PATENT DOCUMENTS

CN         103634812 A    3/2014
KR    10-2011-0067270 A    6/2011
(Continued)

OTHER PUBLICATIONS

Caterpillar, "Cause codes from network", Jul. 20, 2011, Stupidcaterpillar, pp. 1-9 (Year: 2011).*
(Continued)

*Primary Examiner* — Steve R Young
(74) *Attorney, Agent, or Firm* — Birch, Stewart, Kolasch & Birch, LLP

(57) ABSTRACT

A method for a UE to perform public land mobile network (PLMN) selection associated with ProSe direct communication in a wireless communication system according to an embodiment of the present invention includes: selecting a PLMN; and registering with the PLMN, wherein the UE performs ProSe direct communication in the selected PLMN without executing PLMN selection any more, even if the UE fails to register with the selected PLMN, wherein ProSe direct communication in the selected PLMN is performed in a limited service state, wherein the UE is in the limited service state when the UE has not discovered a suitable cell,
(Continued)

when the UE receives "PLMN not allowed" or when the UE receives "GPRS not allowed".

11 Claims, 6 Drawing Sheets

Related U.S. Application Data on Mar. 10, 2015, provisional application No. 62/137,245, filed on Mar. 24, 2015, provisional application No. 62/200,658, filed on Aug. 4, 2015.

(51) Int. Cl.
*H04W 60/00* (2009.01)
*H04W 88/06* (2009.01)
*H04W 76/23* (2018.01)

(52) U.S. Cl.
CPC ......... *H04W 60/005* (2013.01); *H04W 76/23* (2018.02); *H04W 88/06* (2013.01)

(56) References Cited

U.S. PATENT DOCUMENTS

| | | | |
|---|---|---|---|
| 2012/0083245 A1 | 4/2012 | Adjakple et al. | |
| 2015/0156692 A1* | 6/2015 | Kim | H04W 8/02 455/436 |
| 2015/0201392 A1* | 7/2015 | Sartori | H04W 60/00 370/329 |
| 2016/0073335 A1* | 3/2016 | Liao | H04W 48/18 370/329 |
| 2017/0041773 A1* | 2/2017 | Fujishiro | H04W 8/005 |

FOREIGN PATENT DOCUMENTS

| | | |
|---|---|---|
| KR | 10-2012-0033288 A | 4/2012 |
| KR | 10-2014-0146819 A | 12/2014 |
| TW | 201212677 A1 | 3/2012 |
| WO | WO 2013/187672 A1 | 12/2013 |
| WO | WO 2014/046578 A1 | 3/2014 |
| WO | WO 2014/185649 A1 | 11/2014 |
| WO | WO 2015/003153 A1 | 1/2015 |

OTHER PUBLICATIONS

3GPP, "3rd Generation Partnership Project; Technical Specification Group Core Network and Terminals; Non-Access-Stratum (NAS) functions related to Mobile Station (MS) in idle mode (Release 13)," 3GPP TS 23.122 V13.0.0, Dec. 2014, 13 pages.

3GPP, "3rd Generation Partnership Project; Technical Specification Group Core Network and Terminals; Non-Access-Stratum (NAS) functions related to Mobile Station (MS) in idle mode (Release 13)," 3GPP TS 23.122 V13.0.0, Dec. 2014, pp. 1-46.

3GPP, "PLMN selection triggered by Prose direct communication," 3GPP TSG-CT WG1 Meeting #90, Sorrento (Italy), Feb. 2-6, 2015, C1-150167, pp. 1-4.

Ericsson, "Cell selection and reselection for Prose Direct Communication," 3GPP TSG RAN WG2 #89, R2-150330, Athens, Greece, Feb. 9-13, 2015, pp. 1-4.

LG Electronics Inc et al., Introduction of ProSe 3GPP TSGRAN WG2 #88, R2-145419, San Francisco, USA; Nov. 17-21, 2014, pp. 1-7.

Samsung, "Pseudo-CR on optional request for Service Authorisation," 3GPP TSG CT WG1 Meeting #88, Cape Town, South Africa, Jul. 14-18, 2014, C1-142934, 3 pages.

Qualcomm Incorporated et al., "PLMN Selection Triggered by ProSe Direct Communication", 3GPP TSG-CT WG1 Meeting #92, C1-152468, Sanya, China, May 25-29, 2015, 8 pages.

Qualcomm Incorporated, "Multi-Carrier Support Across PLMNs", 3GPP TSG CT WG1 Meeting #90, C1-150164, Sorrento, Italy, Feb. 2-6, 2015, 3 pages.

* cited by examiner

METHOD FOR SELECTING PLMN OF TERMINAL IN WIRELESS COMMUNICATION SYSTEM AND APPARATUS FOR SAME

CROSS REFERENCE TO RELATED APPLICATIONS

This application is the National Phase of PCT International Application No. PCT/KR2016/001154, filed on Feb. 2, 2016, which claims priority under 35 U.S.C. 119(e) to U.S. Provisional Application No. 62/111,055, filed on Feb. 2, 2015, 62/130,628 filed on Mar. 10, 2015, 62/137,245 filed on Mar. 24, 2015 and 62/200,658 filed on Aug. 4, 2015, all of which are hereby expressly incorporated by reference into the present application.

TECHNICAL FIELD

The following description relates to a wireless communication system and, more particularly, to a method and apparatus for a UE to perform PLMN (Public Land Mobile Network) selection associated with ProSe direct communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system.

DISCLOSURE

Technical Problem

An object of the present invention is to provide a method for a UE to perform PLMN (Public Land Mobile Network) selection associated with ProSe direct communication.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The object of the present invention can be achieved by providing a method for a UE to perform public land mobile network (PLMN) selection associated with ProSe direct communication in a wireless communication system, including: selecting a PLMN; and registering with the PLMN, wherein the UE performs ProSe direct communication in the selected PLMN without executing PLMN selection any more, even if the UE fails to register with the selected PLMN, wherein ProSe direct communication in the selected PLMN is performed in a limited service state, wherein the UE is in the limited service state when the UE has not discovered a suitable cell, when the UE receives "PLMN not allowed" or when the UE receives "GPRS not allowed".

In another aspect of the present invention, provided herein is a UE for performing PLMN selection associated with ProSe direct communication in a wireless communication system, including: a transceiver; and a processor, wherein the processor is configured to select a PLMN, to register the UE with the PLMN and to perform ProSe direct communication in the selected PLMN without executing PLMN selection any more, even if the UE fails to register with the selected PLMN, wherein ProSe direct communication in the selected PLMN is performed in a limited service state, wherein the UE is in the limited service state when the UE has not discovered a suitable cell, receives "PLMN not allowed" or receives "GPRS not allowed".

The cause of failed registration with the selected PLMN may be "PLMN not allowed".

The cause of registration failure may be received as a response to a location registration request sent to a cell to which the PLMN belongs.

The cause of failed registration with the selected PLMN may be that the UE has not discovered a suitable cell in the selected PLMN.

ProSe selection may be performed during the ProSe direct communication.

The PLMN may not be included in a list of "forbidden PLMNs".

The PLMN may not be included in a list of "PLMNs with E-UTRAN not allowed".

The PLMN may be included in a list of "authorized PLMNs for ProSe direct communication".

Advantageous Effects

According to the present invention, a UE can effectively select a PLMN and a ping-pong problem which may be generated in a conventional PLMN selection process can be solved.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Figure 1:
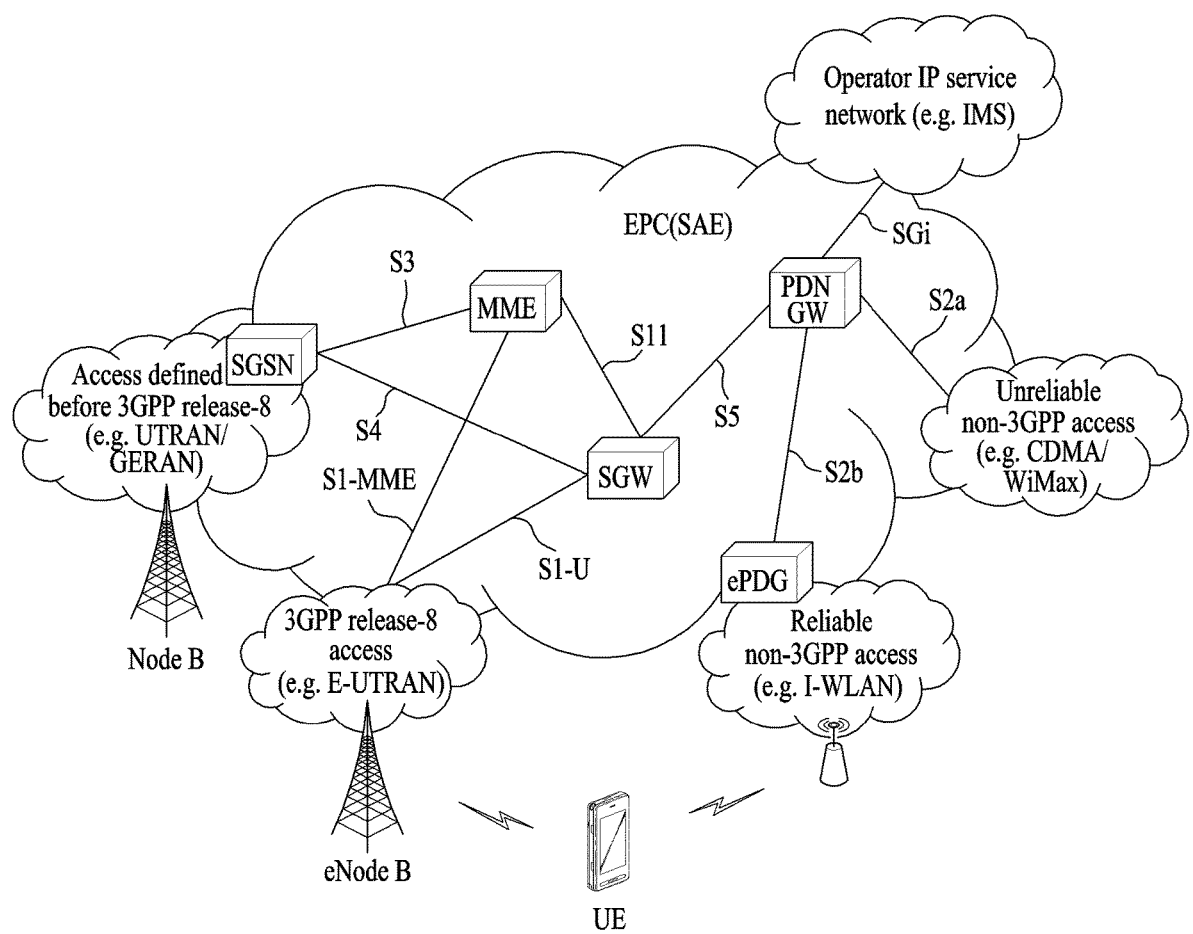
FIG. 1 is a schematic diagram showing the structure of an evolved packet system (EPS) including an evolved packet core (EPC)

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used for the embodiments of the present invention are provided to help in understanding of the present invention. These specific terms may be replaced with other terms within the scope and spirit of the present invention.

In some instances, to prevent the concept of the present invention from being ambiguous, structures and apparatuses of the known art will be omitted, or will be shown in block diagram form based on main functions of each structure and apparatus. In addition, wherever possible, like reference numerals denote the same parts throughout the drawings and the specification.

The embodiments of the present invention can be supported by standard documents disclosed for at least one of wireless access systems including Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by these specifications. Further, all terms as set forth herein can be explained by the standard specifications.

Techniques described herein can be used in various wireless access systems. For clarity, the present disclosure focuses on 3GPP LTE and LTE-A systems. However, the technical features of the present invention are not limited thereto.

Terms used in the following description are defined as follows.

UMTS (Universal Mobile Telecommunication System): 3rd generation mobile communication technology based on a Global System for Mobile Communication (GSM) developed by 3GPP.

EPS (Evolved Packet System): Network system including an Evolved Packet Core (EPC) which is a Packet Switched (PS) core network based on Internet Protocol (IP) and an access network such as LTE/UTRAN, which is evolved from UMTS.

NodeB: Base station of a GERAN/UTRAN, which is installed outdoors and has a coverage corresponding to a macro cell.

eNodeB: Base station of E-UTRAN, which is installed outdoors and has a coverage corresponding to a macro cell.

UE (User Equipment): UE can also be referred to as a terminal, a Mobile Equipment (ME), a Mobile Station (MS) or the like. In addition, the UE can be a portable device such as a laptop computer, a mobile phone, a Personal Digital Assistant (PDA), a smartphone or a multimedia device, or a non-portable device such as a Personal Computer (PC) or a vehicle-mounted device. In MTC, the term "UE" or "terminal" may refer to an MTC device.

HNB (Home NodeB): Base station of a UMTS network, which is installed outdoors and has a coverage corresponding to a macro cell.

HeNB: Base station of an EPS network, which is installed outdoors and has a coverage corresponding to a macro cell.

MME (Mobility Management Entity): Network node of an EPS network, which performs Mobility Management (MM) and Session Management (SM).

PDN-GW (Packet Data Network-Gateway)/P-GW: Network node of an EPS network, which performs UE IP address allocation, packet screening and filtering, charging data collection, etc.

SGW (Serving Gateway): Network node of an EPS network, which performs mobility anchoring, packet routing, idle mode packet buffering, a function of triggering an MME to page a UE, etc.

NAS (Non-Access Stratum): Upper stratum of a control plane between a UE and an MME, which is a functional layer for exchanging signaling and traffic messages between a UE and a core network in an LTE/UMTS protocol stack. Major functions thereof are to support UE mobility and to support a session management procedure for establishing and maintaining an IP connection between a UE and a PDN GW.

PDN (Packet Data Network): Network on which a server supporting a specific service (e.g., MMS (Multimedia Messaging Service) server, WAP (Wireless Application Protocol) server or the like) is located.

PDN connection: Logical connection between a UE and a PDN, represented by a single IP address (e.g., single IPv4 address and/or single IPv6 prefix).

RAN (Radio Access Network): Unit including a NodeB, an eNodeB and a Radio Network Controller (RNC) for controlling the NodeB and the eNodeB in a 3GPP network, which is present between UEs and provides a connection to a core network.

HLR (Home Location Register)/HSS (Home Subscriber Server): Database having subscriber information in a 3GPP network. The HSS can perform functions such as configuration storage, identity management and user state storage.

PLMN (Public Land Mobile Network): Network configured for the purpose of providing mobile communication services to individuals. This network can be configured per operator.

Proximity Service (or ProSe Service or Proximity-based Service): Service of enabling discovery and direct communication between physically adjacent devices, communication through an eNB, or communication through a third device. User-plane data is exchanged through a direct data path without passing through a 3GPP core network (e.g., EPC).

ProSe communication: Communication through a ProSe communication path between two or more ProSe-enabled UEs. Unless otherwise mentioned, ProSe communication may mean one of ProSe E-UTRA communication, ProSe-assisted WLAN direction communication between two UEs, ProSe group communication, and ProSe broadcast communication.

ProSe E-UTRA communication: ProSe communication in a ProSe E-UTRA communication path.

ProSe-assisted WLAN direction communication: ProSe communication in a direct communication path.

ProSe communication path: A communication path supporting ProSe communication. The ProSe E-UTRA communication path may be established between ProSe-enabled UEs or through a local eNB, using E-UTRA. The ProSe-assisted WLAN direction communication path may be established directly between ProSe-enabled UEs using a WLAN.

EPC path (or infrastructure data path): A user-plane communication path through an EPC.

ProSe discovery: A process of identifying/determining an adjacent ProSe-enabled UE using an E-UTRA.

ProSe Group Communication: One-to-many ProSe communication using a common communication path, between two or more adjacent ProSe-enabled UEs.

ProSe UE-to-Network Relay: A ProSe-enabled public safety UE operating as a communication relay between a ProSe-enabled network using an E-UTRA and a ProSe-enabled public safety UE.

ProSe UE-to-UE Relay: A ProSe-enabled public safety UE operating as a communication relay between two or more ProSe-enabled public safety UEs.

Remote UE: A ProSe-enabled public safety UE connected to an EPC network, that is, receiving a PDN connection through a ProSe UE-to-Network Relay without being serviced by an E-UTRAN in a UE-to-Network Relay operation, and a ProSe-enabled public safety UE communicating with another ProSe-enabled public safety UE through a ProSe UE-to-UE Relay in a UE-to-UE Relay operation.

ProSe-enabled Network: A network supporting ProSe discovery, ProSe communication, and/or ProSe-assisted WLAN direct communication. Hereinafter, a ProSe-enabled network may be referred to shortly as a network.

ProSe-enabled UE: A UE supporting ProSe discovery, ProSe communication, and/or ProSe-assisted WLAN direct communication. Hereinafter, a ProSe-enabled UE or a ProSe-enabled public safety UE may be referred to shortly as a UE.

Proximity: satisfying a proximity decision criterion defined for each of discovery and communication.

SLP (SUPL Location Platform): An entity responsible for location service management and position determination. The SLP includes a SUPL Location Center (SLC) function and a SUPL Positioning Center (SPC) function. For details, refer to an Open Mobile Alliance (OMA) standard document, OMA AD SUPL: "Secure User Plane Location Architecture".

USD (User Service Description): The Application/service layer includes information about a Temporal Mobile Group Identity (TMGI) for each MBMS service, the starting time and ending time of a session, frequencies, MBMS service area identifies (MBMS SAIs) belonging to an MBMS service area, and so on in USD, and transmits the USD to a UE. For details, refer to 3GPP TS 23.246.

ISR (Idle mode Signalling Reduction): If a UE frequently moves between an E-UTRAN and a UTRAN/GERAN, the resulting repeated location registration procedures cause network resource waste. To reduce the network resource waste, if the UE is in idle mode, the UE registers a location to each of an MME and an SGSN (hereinafter, referred to as mobility management nodes) via the E-UTRAN and the UTRAN/GERAN, and then if the UE moves between already registered RATs (Radio Access Technologies) or performs cell reselection, the UE does not register a location additionally. Therefore, if Downlink (DL) data for the UE arrives, the UE is successfully detected by paging both of the E-UTRAN and the UTRAN/GERAN and data is transmitted to the UE [refer 3GPP TS 23.401 and 3GPP TS 23.60].

Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
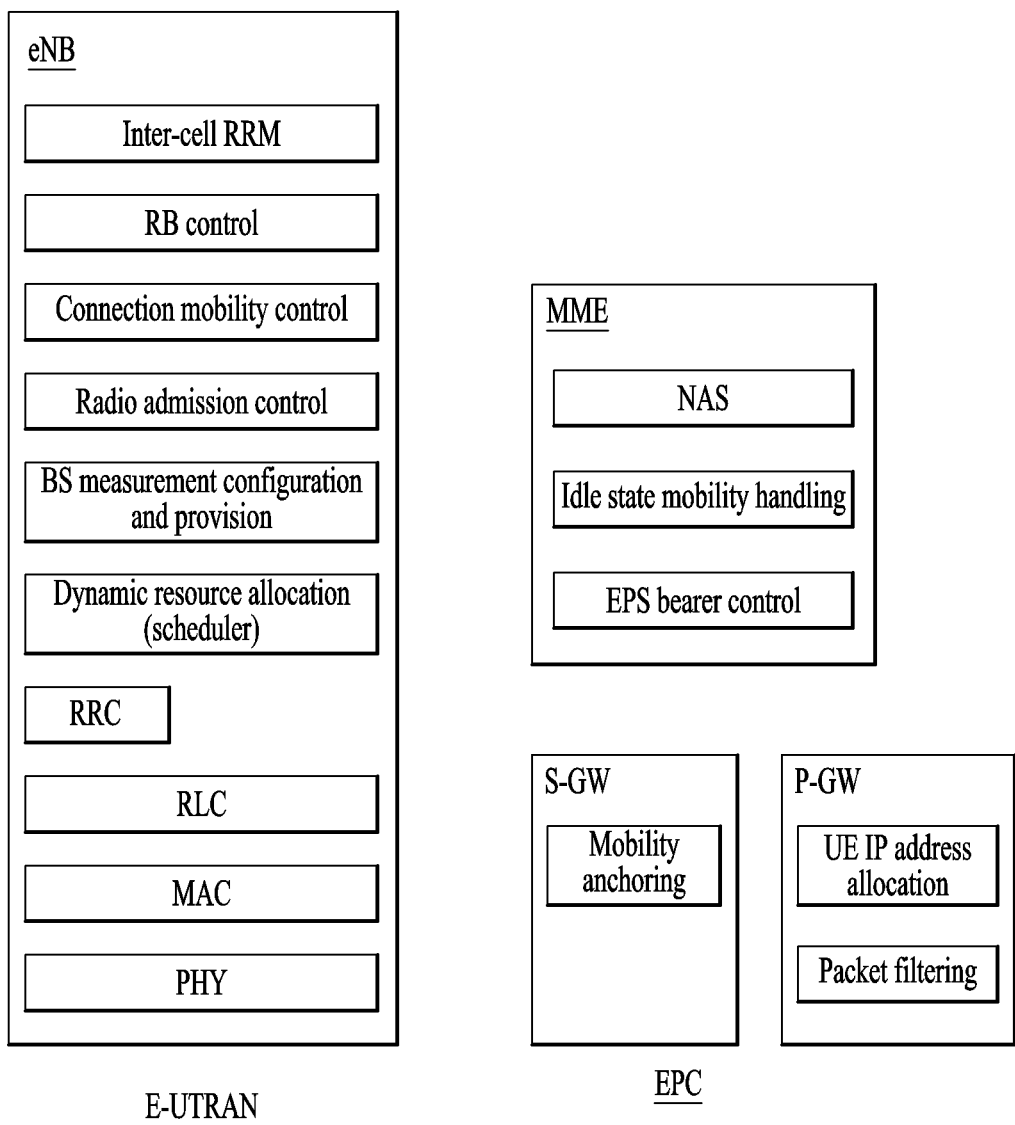
FIG. 2 is a diagram exemplarily illustrating architectures of a typical E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
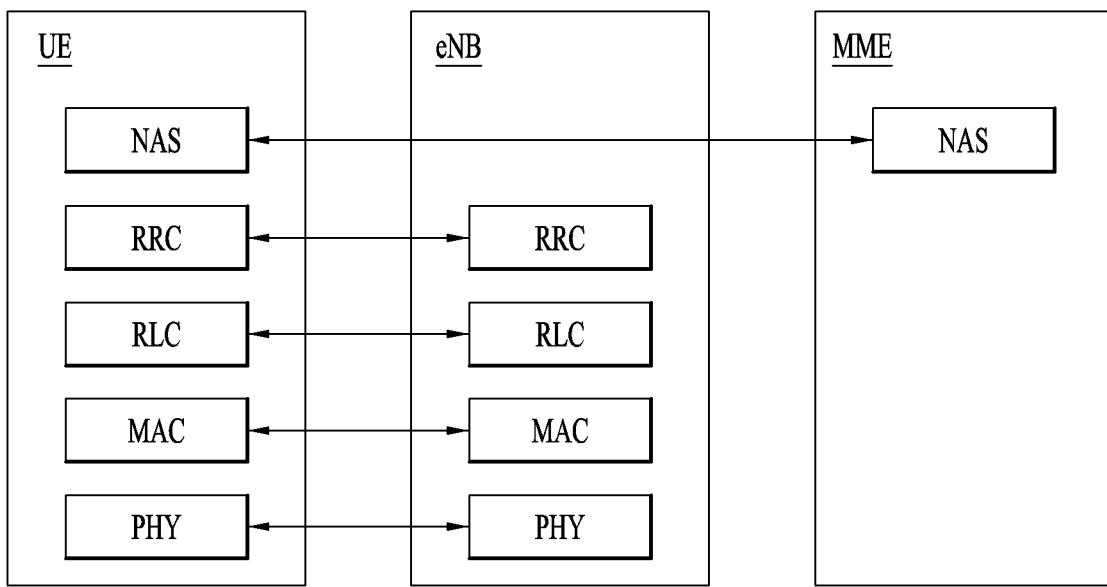
FIG. 3 is a diagram exemplarily illustrating the structure of a radio interface protocol in a control plane.
Figure 4:
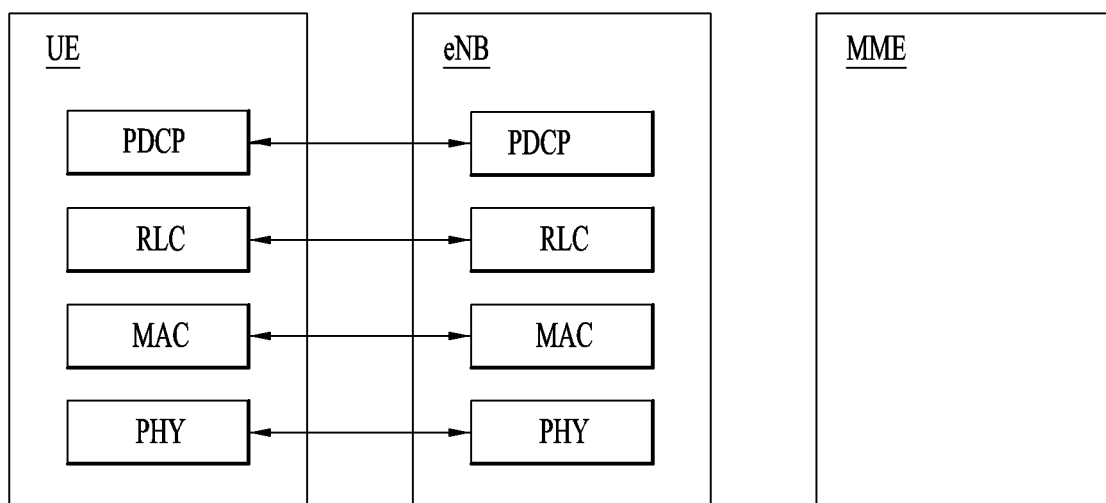
FIG. 4 is a diagram exemplarily illustrating the structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast in a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
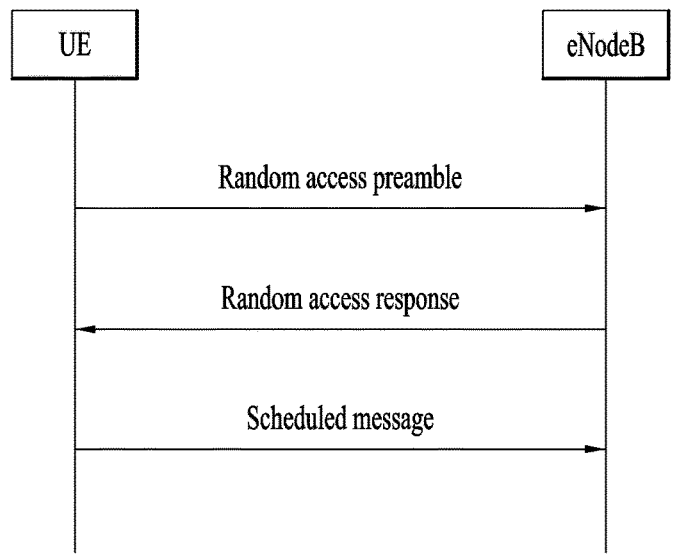
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
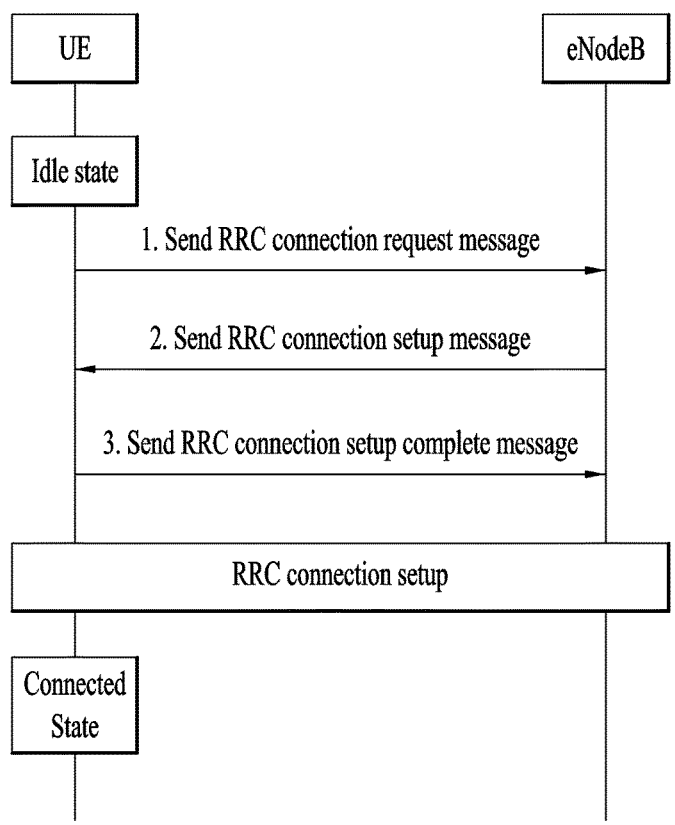
FIG. 6 illustrates a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNodeB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

PLMN (Public Land Mobile Network) Selection

A PLMN may refer to a mobile communication network (service provider network, e.g., service provider network identification number) and PLMN selection refers to a procedure/process of selecting a PLMN to be accessed. A NAS of a UE can evaluate information on PLMNs, reported by an AS, and select a PLMN with which the UE will register from the PLMNs. In this process, PLMN/RAT priority stored in a USIM (User Services Identity Module) can be used. PLMN selection may be classified into an automatic PLMN selection scheme in which a UE automatically selects an available PLMN from a priority based PLMN list, and a manual PLMN selection scheme in which a user directly selects a PLMN from a list of PLMNs provided by the AS of the UE. The UE may select a PLMN/RAT and attempt registration until the UE successfully registers with a selected PLMN/RAT. Here, PLMN/RAT order (which may be PLMN list order shown to the UE) may be PLMNs listed in the HPLMN (Home PLMN) or the EHPLMN (Equivalent HPLMN), PLMNs listed in the "User Controlled PLMN Selector with Access Technology", PLMNs listed in the "Operator Controlled PLMN Selector with Access Technology", PLMNs reported by the AS as high quality PLMNs, or MNs reported by the AS in decreasing order of signal quality.

Upon selection of a PLMN, the UE discovers suitable cells from among cells belonging to the PLMN and selects a cell which can provide a suitable service. Specifically, when the NAS layer notifies the AS layer that PLMN selection is required, the AS layer searches corresponding bands and sends a PLMN list to the NAS layer. Then, the NAS layer can select a PLMN by searching PLMNs in the PLMN list according to priority and select a cell which broadcasts the PLMN. This process can be referred to as "camping on the cell". The UE can attempt to register with the selected PLMN by sending location registration (LR) and attach requests to a suitable cell. If the UE cannot discover a suitable cell or LR is not accepted (rejection response), the UE fails to register with the selected PLMN.

a) When a suitable cell cannot be detected from a selected PLMN, b) when the UE has no SIM, c) when "PLMN not allowed" is received through a response to LR, d) when "illegal MS" or "illegal ME" is received through the response to LR, e) when "IMSI unknown in HLR" is received, f) in the case of "GPRS not allowed" when LR of "GPRS MS attached to GPRS services only" is received and g) when a power saving mode (PSM) is activated, the UE can be served while being in a limited service state in the selected PLMN. If the UE has a valid SIM and is in the limited service state, the UE searches PLMNs.

Embodiment

A description will be given of PLMN selection associated with ProSe direct communication (PLMN selection triggered by ProSe direct communication) according to an embodiment of the present invention on the basis of the above description. In the following description, a UE may be in a limited service state or a normal service state (state in which normal services can be provided, other than the limited service state). In other words, the UE may be in all or some of i) a state in which a UE in the normal service state selects a PLMN in order to start ProSe direct service, ii) a state in which a UE in the limited service state and performing ProSe direct service selects a PLMN, iii) a state in which a UE in the normal service state and performing ProSe direct service selects a PLMN and iv) a state in which a UE in the limited service state selects a PLMN in order to start ProSe direct service. Here, the limited service state in PLMN selection associated with ProSe direct communication refers to a) Failure to find a suitable cell of the selected PLMN, c) A "PLMN not allowed" response when an LR is received; and f) A "GPRS services not allowed" response when an LR of a GPRS MS attached to GPRS services only is received (The cell selection state of GPRS MSs attached to GPRS and non-GPRS depends on the outcome of the location updating), or an "EPS services not allowed" response is received when an EPS attach, tracking area update or service request is performed.

A UE according to an embodiment of the present invention confirms the location thereof in a geographical area and, when radio parameters are provisioned in the geographical area, selects a radio parameter associated with the geographical area, when the UE is not served by E-UTRAN (e.g., outside of E-UTRAN coverage, within E-UTRAN coverage but not camped on any cell, within E-UTRAN coverage but camped on a non-E-UTRAN cell, or camped on an E-UTRAN cell not operating on the carrier frequency provisioned for ProSe direct service). The UE checks whether the selected radio parameter applies interference to another cell at the current location. If the radio parameter applies interference to the other cell, the UE checks whether the other cell satisfies the following conditions. When the cell operates the provisioned radio resources (i.e., carrier frequency) and does not belong to an RPLMN or an EPLMN, if any of PLMNs reported by the cell is not the RPLMN or EPLMN and at most one PLMN is included in the list of authorized PLMNs for ProSe direct communication, the UE performs PLMN selection triggered by ProSe direct communication. When the UE performs PLMN selection triggered by ProSe direct communication, the UE selects candidates PLMN which become targets of PLMN selection. When all of 1) the condition that PLMNs provide radio resources for ProSe direct communication, 2) the condition that the PLMNs are included in the list of authorized PLMNs for ProSe direct communication and 3) the condition that the PLMNs are not included in lists of "forbidden PLMNs", "forbidden PLMNs for EPS services" and "PLMNs with E-UTRAN not allowed" are satisfied, the corresponding PLMNs become candidate PLMNs. The UE can select one of the candidate PLMNs. The UE can register with the selected PLMN. In this case, even when the UE fails to register with the selected PLMN, the UE can perform ProSe direct communication in the selected PLMN without performing PLMN selection any more. Here, ProSe direct communication in the selected PLMN is performed in the limited service state. When a UE which starts or is performing ProSe direct service selects a PLMN, the UE searches PLMNs for a PLMN satisfying ProSe PLMN candidate selection conditions and selects the PLMN. When there is no PLMN satisfying the ProSe PLMN candidate selection conditions, the UE does not perform PLMN selection until execution of ProSe direct service is ended in the current PLMN. The UE may not perform PLMN selection until execution of the ProSe direct service is terminated in the current PLMN, without detecting a PLMN satisfying the ProSe PLMN candidate selection conditions.

Figure 7:
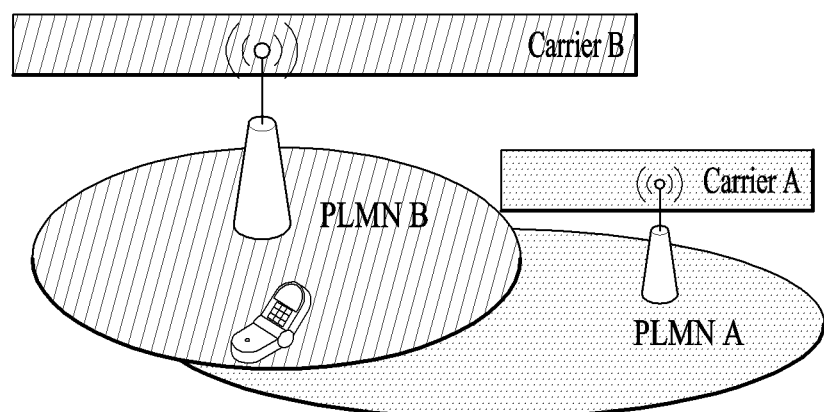
FIG. 7 illustrates a problem which can be generated in PLMN selection.

Through this operation, the ping-pong problem that may be generated during a PLMN selection process can be solved. For example, PLMN B on which a UE is camped does not provide the ProSe direct service, whereas PLMN A provides the ProSe service in FIG. 7. PLMN A is a registered PLMN but not an equivalent PLMN. In this case, the UE searches for a cell that provides a provisioned radio resource irrespective of PLMNs and recognizes that the cell belongs to PLMN A. The UE can trigger PLMN selection for selecting PLMN A. While the UE can select PLMN A, the UE enters a limited service state and an EMM-IDLE mode upon reception of an attach reject message including EMM cause #11 "PLMN not allowed" or EMM cause #7 "EPS services not allowed", a tracking area update message or a service reject message. According to conventional technology, the UE needs to perform PLMN selection although the UE can perform the ProSe direct service. In this case, PLMN B can be re-selected and thus the UE cannot perform the ProSe direct service. Accordingly, the UE re-selects PLMN A in order to execute the ProSe direct service and the aforementioned process can be repeated. The present invention can solve such a problem by enabling the UE to perform ProSe direct communication in a selected PLMN in the limited service state without performing a PLMN selection process any more even if the UE fails to register with the selected PLMN, as described in the embodiment of the present invention.

The cause of failed registration with the selected PLMN may be "PLMN not allowed". The cause of registration failure may be received as a response to a location registration request transmitted to a cell belonging to the PLMN. Otherwise, the cause of failed registration with the selected PLMN is that the UE cannot detect a suitable PLMN in a selected ell.

In PLMN selection, a PLMN may not be included in a list of "forbidden PLMNs". That is, when one or more PLMNs are selected under the ProSe PLMN candidate selection conditions, PLMNs included in the forbidden PLMN list can be excluded.

A PLMN may not be included in a list of "PLMNs with E-UTRAN not allowed"

A PLMN may be essentially included in "an authorized PLMN list". That is, the UE must consider a service authorized PLMN list for PLMN selection triggered by ProSe direct communication. A PLMN may be a PLMN (that may include a geographical area along with a radio parameter) that provides a provisioned radio resource included in authorization information for a case of "not served by E-UTRAN". Each PLMN in the list of PLMNs in which the UE is authorized uses direct communication when served by E-UTRAN.

A UE (NAS layer) does not consider/select or must not consider/select a PLMN for which LR failure causes registration failure, or a PLMN included in "forbidden location areas for roaming", PLMNs in "forbidden tracking areas for roaming", PLMNs in "forbidden location areas for regional provision of service", PLMNs in "forbidden tracking areas for regional provision of service", "forbidden PLMNs", "forbidden PLMNs for GPRS service" or "PLMNs with E-UTRAN not allowed".

A PLMN that satisfies one of the aforementioned conditions can be selected. Only one of the two conditions may need to be satisfied or all conditions may need to be satisfied. When all conditions are considered, priority of conditions which need to be satisfied by a PLMN to be selected can be determined as necessary.

Figure 8:
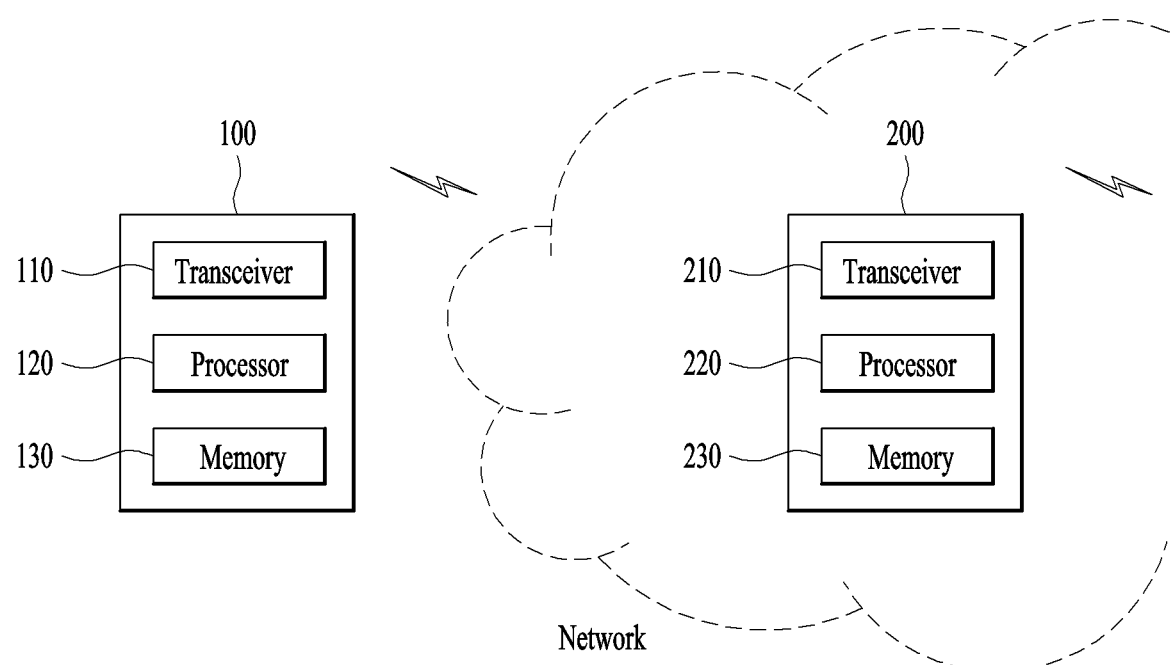
FIG. 8 is a diagram exemplarily illustrating the configurations of node devices according to an embodiment of the present invention.

FIG. 8 illustrates configurations of a UE and a network node according to an embodiment of the present invention.

Referring to FIG. 8, a UE 100 according to the present invention may include a transceiver 110, a processor 120 and a memory 130. The transceiver 110 may be configured to transmit signals, data and information to an external device and to receive signals, data and information from the external device. The UE 100 may be connected to the external device in a wired or wireless manner. The processor 120 may control the overall operation of the UE 100 and may be configured to process information transmitted/received between the UE 100 and the external device. In addition, the processor 120 may be configured to perform UE operation proposed by the present invention. The memory 130 may store processed information for a predetermined time and may be replaced by a component such as a buffer (not shown).

Referring to FIG. 8, a network node 200 according to the present invention may include a transceiver 210, a processor 220 and a memory 230. The transceiver 210 may be configured to transmit signals, data and information to an external device and to receive signals, data and information from the external device. The network node 200 may be connected to the external device in a wired or wireless manner. The processor 220 may control the overall operation of the network node 200 and may be configured to process information transmitted/received between the network node 200 and the external device. In addition, the processor 220 may be configured to perform network node operation proposed by the present invention. The memory 230 may store processed information for a predetermined time and may be replaced by a component such as a buffer (not shown).

The aforementioned UE 100 and network node 200 may be implemented such that the above-described various embodiments of the present invention are independently applied or two or more thereof are simultaneously applied, and description of redundant parts is omitted for clarity.

The embodiments of the present invention may be achieved by various means, for example, hardware, firmware, software, or a combination thereof.

In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above embodiments of the present invention have been described based on 3GPP, the embodiments can be equally applied to various mobile communication systems.

The invention claimed is:

1. A method for a user equipment (UE) to perform public land mobile network (PLMN) selection associated with proximity services (ProSe) direct communication in a wireless communication system, the method comprising:
camping, by the UE, on a first PLMN in a normal service state;
in response to the first PLMN not providing ProSe direct communication resources, selecting, by the UE, a second PLMN providing ProSe direct communication resources;
performing, by the UE, a registration on the second PLMN;
receiving, by the UE, a failed registration code of "PLMN not allowed" due to failing of the registration on the second PLMN; and
performing, by the UE, the ProSe direct communication on the registration-failed second PLMN in a limited service state,
wherein the UE remains camped on the first PLMN in the normal service state and does not perform an additional PLMN selection during a duration of the ProSe direct communication in the registration-failed second PLMN, after entering the limited service state.

2. The method according to claim 1, wherein a cause of registration failure is received as a response to a location registration request sent to a cell to which the second PLMN belongs.

3. The method according to claim 1, wherein a cause of failed registration with the second PLMN is that the UE has not discovered a suitable cell in the second PLMN.

4. The method according to claim 1, wherein ProSe selection is performed during the ProSe direct communication.

5. The method according to claim 1, wherein the second PLMN is not included in a list of "forbidden PLMNs".

6. The method according to claim 5, wherein the second PLMN is not included in a list of "PLMNs with E-UTRAN not allowed".

7. The method according to claim 5, wherein the second PLMN is included in a list of "authorized PLMNs for ProSe direct communication".

8. A user equipment (UE) for performing public land mobile network (PLMN) selection associated with proximity services (ProSe) direct communication in a wireless communication system, the UE comprising:
a transceiver; and
a processor,
wherein the processor is configured to:
camp on a first PLMN in a normal service state,
in response to the first PLMN not providing ProSe direct communication resources, select a second PLMN providing ProSe direct communication resources,
perform a registration on the second PLMN,
receive a failed registration code of "PLMN not allowed" due to failing of the registration on the second PLMN, and
perform the ProSe direct communication on the registration-failed second PLMN in a limited service state, and
wherein the UE remains camped on the first PLMN in the normal service state and does not perform an additional PLMN selection during a duration of the ProSe direct communication in the registration-failed second PLMN, after entering the limited service state.

9. The UE according to claim 8, wherein the second PLMN is not included in a list of "forbidden PLMNs".

10. The UE according to claim 8, wherein the second PLMN is not included in a list of "PLMNs with E-UTRAN not allowed".

11. The UE according to claim 8, wherein the second PLMN is included in a list of "authorized PLMNs for ProSe direct communication".

* * * * *